United States Patent Office.

JOEL WHITNEY, OF WINCHESTER, MASSACHUSETTS.

*Letters Patent No.* 8,881, *dated April* 13, 1852; *extended seven years; reissue No.* 2,676, *dated July* 9, 1867.

IMPROVEMENT IN WOOD-PLANING MACHINES.

The Schedule referred to in these Letters Patent and making part of the same.

TO ALL WHOM IT MAY CONCERN:

Be it known that I, JOEL WHITNEY, of Winchester, Massachusetts, did invent certain new and useful improvements in the Feed Apparatus of Planing Machines, and that the following is a full, clear, and exact description of the construction and operation of the same, reference being had to the accompanying drawings making a part of this specification, in which—

Figure 1 represents a side elevation of a planing machine, having my improvement attached.

Figure 2 represents a plan of the same; and

Figure 3 represents a detail view of the guide-rails, &c., which hold the board.

Figure 4 represents a front elevation of the machine.

Attempts were made previous to my invention to drive the yielding one of a pair of feed rolls by the use of intermediate gears, that were all movable and linked together by straps or links, but that plan failed, as there was a mechanical difficulty, if not a mechanical impossibility, in the way of its practical operation. Another attempt was made, wherein the intermediate gears were fixed, and the yielding one, of the pairs of feed rolls, as it was raised or lowered, moved in the arc of a circle, the centre of which was the centre of the drive-wheel, and it consequently did not bear vertically upon the non-yielding roll, when moved to any extent, and the consequence of its moving out of a vertical line with its mate or fellow was that a bend was put in the board, and, slight as it appeared to be, it became almost impossible to drive the board through with this bend in it, and this construction also failed.

Avoiding the two plans above mentioned, because of their impracticability, I reduced the number of intermediate gears, changed the plan of linking the intermediate gears to the yielding roll, and not linking it at all to the non-yielding and drive-roll. I also made one of the intermediate gears a fixed one, and the other a movable one, so that as the yielding feed roll moved up or down vertically over the lower non-yielding one, there was but a single intermediate gear to move to keep all in perfect working connection.

I also in my experiments was the first to discover the importance of connecting the gears by shafts extending clear across the machine, and duplicating the gears and straps or links on both sides, so that the power to move the rolls or the shafts was applied at both of their ends simultaneously, and by this means the pressure was always uniform, and there was no bending or straining of journals, which must inevitably take place when the rolls or shafts are lifted or driven from one end or side only. If this were mere duplication of devices without effect, it would not be regarded as invention, but in view of the important results it produces, both in saving of power and of machinery, it is a valuable addition to the feed rolls and to the planing machine.

My invention consists, therefore, in using, in connection with a pair of feed rolls, one of which is fixed, and the other is a yielding one, a pair of intermediate gears, one of which is fixed, and the other a movable one, so that as the yielding feed roll moves, it will correspondingly move the yielding intermediate gear, and thus keep all in mesh without undue friction, or any liability of breaking the cogs of the several gears. And my invention further consists in using duplicate gearing on each of the ends of the rolls and shafts, and connecting the linked intermediate gears by shafts running clear across the machine, so that both the lifting and driving shall be from both ends of the rolls and shafts, and thus avoid twisting, bending, or straining of the journals, which makes unequal pressure upon the edges of the board passing through, and consequently imperfect work.

To enable others skilled in the art to make and use my invention, I will proceed to describe the same with reference to the drawings.

A A A, in the drawings, represent the framework of the machine. B B are the two feed rolls, each furnished at each of its ends with large gear-wheels C C, which are connected to each other by the smaller intermediate gear-wheels D D′, one set or pair on each end of the shafts H I respectively, which extend clear across the machine, so as to move and drive from both of their ends simultaneously, and with uniform power or force. The bearings E of the upper roll, one at each end of it, are allowed to play up and down in the standards F F, being placed in or upon the sliding supports G, one in each standard. The driving-shaft H, on which the gear-wheels D′ are placed, as seen in fig. 4, is connected to the shaft I, on which the gear-wheels D are placed, by the short movable vertical arm K; and the shaft I is connected to the shaft L of the upper feed roll, which is the yielding one of the pair, by the inclined moving-arm M, thus connecting the shaft of the stationary wheels D′ to the vertical sliding-bearings E of the upper feed roll.

It will be perceived that as the wheels D′ revolve, they will tend to force the gears D, whose shaft is movable, having its bearings in the arms K M, from said upper roll, or out of connection with the gear C C, but this is prevented by the arms M, which hold them always in a geared position relatively to each other, whilst they may independently have different movements, as, for instance, the gears D can only move in the arc of a circle, of which the arm M is a radius, whilst the roll B moves up and down vertically.

It is obvious that the arrangement by which the feed rolls are made to act upon the board, as above described, can be applied to machines for planing, as well as to machines for tonguing and grooving; and also that the lower feed roll may be made movable or yielding, and the upper one stationary or non-yielding, and which will work equally well, by simply having a spring or weight to counterbalance the weight of said lower roll. And the feed rollers may be fluted or otherwise roughened for the better holding of the board operated upon.

In tonguing and grooving, it has been usual to so construct as that the lower guide-rails for holding the board should be movable, so as to allow it to yield in case any shavings or other obstructions should get between the board and said rails, but by thus allowing the lower rail and consequently the board upon it to yield while the cutting tools were stationary, an irregular tongue or groove was necessarily formed in the board. By my construction this defect is remedied, as I make the upper guide-rail movable, and the lower one stationary, so that in case of any obstruction the upper rail alone moves, and the board maintains the same position with regard to the cutting tools.

N N are the movable slide, which is fed up on the screws O O, by the bevel-gears P P. Q Q are the stocks for the cutting tools, which are made and placed in the usual well-known way. R R′, fig. 3, are the guide-rails, the lower one, R′, being stationary, while the upper one, R, is movable and adjustable, being held by the screws S S, around which are spiral springs T T, which bear against the nuts U U.

By the above-described arrangement it will be seen that when any obstruction gets between the guide-rails and the boards, the upper one, by the nuts U U pressing against the springs *s s*, will rise, whilst the board will remain level upon the lower guide, and thus prevent the tongue or groove from becoming irregular.

Having thus fully described my invention, what I claim, is—

1. In combination with a pair of feed rolls, one of which is yielding, and the other is not, a pair of intermediate gars, one of which is fixed and the other is not, substantially as and for the purpose described.

2. I also claim, in combination with a pair of feed rolls, geared and driven from both of their ends, and the duplicate sets of intermediate gears working in and with them, the connecting of said intermediate or driving-gears, by substantial shafts, extending clear across from one set to the opposite set, by which the lifting and driving are done at both ends of the rolls, and the twisting, bending, or straining of journals or bearings avoided, substantially as described.

JOEL WHITNEY.

Witnesses:

CHAS. W. UNDERHILL,

WILLIAM ROGERS.